(12) United States Patent
Chintalapati et al.

(10) Patent No.: US 10,559,298 B2
(45) Date of Patent: Feb. 11, 2020

(54) DISCUSSION MODEL GENERATION SYSTEM AND METHOD

(71) Applicant: International Business Machines Corporation, Armonk, NY (US)

(72) Inventors: Padma D. Chintalapati, Visakhapatnam (IN); Prasad H. Velagapudi, Visakhapatnam (IN)

(73) Assignee: International Business Machines Corporation, Armonk, NY (US)

(*) Notice: Subject to any disclaimer, the term of this patent is extended or adjusted under 35 U.S.C. 154(b) by 99 days.

(21) Appl. No.: 15/845,085

(22) Filed: Dec. 18, 2017

(65) Prior Publication Data

US 2019/0189110 A1   Jun. 20, 2019

(51) Int. Cl.
*G10L 13/10* (2013.01)
*G06F 17/22* (2006.01)
*G06F 16/432* (2019.01)
*G06F 17/21* (2006.01)
*G06K 9/00* (2006.01)

(52) U.S. Cl.
CPC ............ *G10L 13/10* (2013.01); *G06F 16/433* (2019.01); *G06F 17/2247* (2013.01); *G06F 17/214* (2013.01); *G06K 9/00442* (2013.01)

(58) Field of Classification Search
CPC ........................................................ G10L 13/10
USPC ........................................................ 704/270
See application file for complete search history.

(56) References Cited

U.S. PATENT DOCUMENTS

| | | | |
|---|---|---|---|
| 8,380,485 B1 * | 2/2013 | Callahan | G09B 19/06 380/1 |
| 8,810,583 B2 | 8/2014 | Kang et al. | |
| 9,106,812 B1 | 8/2015 | Price et al. | |
| 9,666,208 B1 * | 5/2017 | Rubin | G06F 17/21 |
| 9,792,534 B2 * | 10/2017 | Wang | G06K 9/00664 |
| 9,811,765 B2 * | 11/2017 | Wang | G06N 3/08 |
| 10,009,644 B2 * | 6/2018 | Aimone | A61B 5/0476 |
| 2013/0332859 A1 | 12/2013 | Patton et al. | |
| 2017/0098324 A1 | 4/2017 | Srinivasan | |

* cited by examiner

*Primary Examiner* — Susan I McFadden
(74) *Attorney, Agent, or Firm* — Richard A. Wilhelm (57) ABSTRACT

A method, computer program product, and computing system for receiving an input text. The one or more portions of the input text may be tagged. A discussion model between a plurality of virtual speakers may be generated based upon, at least in part, the tagging of the one or more portions of the input text. The discussion model may be presented.

17 Claims, 8 Drawing Sheets

*As students we all have been challenged to do our best. Throughout our lives we have been labeled with our grades; in high school, the ones with low grades were left alone in misery, while the ones with higher grades were praised as the leaders of this horse race. Then, the question that comes into mind is: is it right to categorize students, does grading contribute to education? Grading gives students a clear cut idea of their weaknesses and strengths. Knowing precisely which subject(s) are their weak spots, students can easily decide where to toggle their focal point on. However, it is assumed and stated in the philosophy of the current educational system that grading encourages learning and without it students would not study. That is far from being true and also expresses another flaw of our education system. The system is based on fear: the basic motive for students to study is fear of low grades. Furthermore, because the grades are the main criteria for passing courses, students do not study: they just develop methods of cheating. Thus, without learning the subject, they keep passing. However, they pass exams without learning why, how or what of the matter. Since grades received in exams are more important than learning the subject matter, all students have to do to pass their courses is memorize how a specific problem is solved. Without knowing why such a method is used, students cannot apply their ability to solve the problem to daily life. Another disadvantage of grading is that grades of a student are not updated. That means the grades of a student for the first year of school will still be valid in the last year, whether his knowledge about the subject has improved or deteriorated. Considering all the factors that affect a student's exams and marks, even a small incident may have a great impact in the long run. Grading students is not a good practice and should be abolished. It is clear that education, especially education during childhood, has a great effect on one's life. And if you bring the children up in conditions of conflict and competition, they will look for conflicts in the future too.*

As students we all have been challenged to do our best. Throughout our lives we have been labeled with our grades; in high school, the ones with low grades were left alone in misery, while the ones with higher grades were praised as the leaders of this horse race. Then, the question that comes into mind is: is it right to categorize students, does grading contribute to education?

402

(Positive Sentences) Grading gives students a clear cut idea of their weaknesses and strengths. Knowing precisely which subject(s) are their weak spots, students can easily decide where to toggle their focal point on.

404

(Negative Sentences) It is assumed and stated in the philosophy of the current educational system that grading encourages learning and without it students would not study. That is far from being true and also expresses another flaw of our education system.

406

(Positive Sentences) The system is based on fear: the basic motive for students to study is fear of low grades. Furthermore, because the grades are the main criteria for passing courses, students do not study: they just develop methods of cheating. Thus, without learning the subject, they keep passing. However, they pass exams without learning why, how or what of the matter.

408

(Positive Sentences) Since grades received in exams are more important than learning the subject matter, all students have to do to pass their courses is memorize how a specific problem is solved. Without knowing why such a method is used, students cannot apply their ability to solve the problem to daily life.

410

(Positive Sentences) Another disadvantage of grading is that grades of a student are not updated. That means the grades of a student for the first year of school will still be valid in the last year, whether his knowledge about the subject has improved or deteriorated. Considering all the factors that affect a student's exams and marks, even a small incident may have a great impact in the long run.

412

(Neutral Sentences) Grading students is not a good practice and should be abolished. It is clear that education, especially education during childhood, has a great effect on one's life. And if you bring the children up in conditions of conflict and competition, they will look for conflicts in the future too.

Narrator – As students we all have been challenged to do our best. Throughout our lives we have been labeled with our grades; in high school, the ones with low grades were left alone in misery, while the ones with higher grades were praised as the leaders of this horse race. Then, the question that comes into mind is: is it right to categorize students, does grading contribute to education?

502

Speaker 1 – Grading gives students a clear cut idea of their weaknesses and strengths. Knowing precisely which subject(s) are their weak spots, students can easily decide where to toggle their focal point on.

504

Speaker 2 – It is assumed and stated in the philosophy of the current educational system that grading encourages learning and without it students would not study. That is far from being true and also expresses another flaw of our education system.

506

Speaker 1 – The system is based on fear: the basic motive for students to study is fear of low grades. Furthermore, because the grades are the main criteria for passing courses, students do not study: they just develop methods of cheating. Thus, without learning the subject, they keep passing. However, they pass exams without learning why, how or what of the matter.

508

Speaker 2 – Since grades received in exams are more important than learning the subject matter, all students have to do to pass their courses is memorize how a specific problem is solved. Without knowing why such a method is used, students cannot apply their ability to solve the problem to daily life.

510

Speaker 1 – Another disadvantage of grading is that grades of a student are not updated. That means the grades of a student for the first year of school will still be valid in the last year, whether his knowledge about the subject has improved or deteriorated. Considering all the factors that affect a student's exams and marks, even a small incident may have a great impact in the long run.

512

Speaker 2 – Grading students is not a good practice and should be abolished. It is clear that education, especially education during childhood, has a great effect on one's life. And if you bring the children up in conditions of conflict and competition, they will look for conflicts in the future too.

As students we all have been challenged to do our best. Throughout our lives we have been labeled with our grades; in high school, the ones with low grades were left alone in misery, while the ones with higher grades were praised as the leaders of this horse race. Then, the question that comes into mind is: is it right to categorize students, does grading contribute to education?

602

Speaker 1 – Personally I think (Positive Sentence) *Grading gives students a clear cut idea of their weaknesses and strengths. Knowing precisely which subject(s) are their weak spots, students can easily decide where to toggle their focal point on.*

604

Speaker 2 – I am sure you're mistaken, (Discordant Phrases) *It is assumed and stated in the philosophy of the current educational system that grading encourages learning and without it students would not study. That is far from being true and also expresses another flaw of our education system.*

606

Speaker 1 – I agree with you. (Accordant Phrases) *The system is based on fear: the basic motive for students to study is fear of low grades. Furthermore, because the grades are the main criteria for passing courses, students do not study: they just develop methods of cheating. Thus, without learning the subject, they keep passing. However, they pass exams without learning why, how or what of the matter.*

608

Speaker 2 – I am of the same opinion, (Accordant Phrases) *Since grades received in exams are more important than learning the subject matter, all students have to do to pass their courses is memorize how a specific problem is solved. Without knowing why such a method is used, students cannot apply their ability to solve the problem to daily life.*

610

Speaker 1 – Yes, you are right. (Accordant Phrases) *Another disadvantage of grading is that grades of a student are not updated. That means the grades of a student for the first year of school will still be valid in the last year, whether his knowledge about the subject has improved or deteriorated. Considering all the factors that affect a student's exams and marks, even a small incident may have a great impact in the long run.*

612

Speaker 2 – To cut a long story short, (Neutral Phrase) *Grading students is not a good practice and should be abolished. It is clear that education, especially education during childhood, has a great effect on one's life. And if you bring the children up in conditions of conflict and competition, they will look for conflicts in the future too.*

DISCUSSION MODEL GENERATION SYSTEM AND METHOD

BACKGROUND

Applications and systems have been developed, which provide for learning by presenting content in a plain text format. Even with the addition of pictures and diagrams, this format may be difficult for some to understand or to learn from. As such, reading plain text may not draw the interest of many people. In some instances, people may learn better by listening to a discussion of a topic or subject. Though reading is one of the primary ways we learn, presenting content in a discussion model may help people to become more interested and engaged in learning new concepts.

BRIEF SUMMARY OF DISCLOSURE

In one example implementation, a computer-implemented method is executed on a computing device and may include but is not limited to receiving, at a computing device, an input text. The one or more portions of the input text may be tagged. A discussion model between a plurality of virtual speakers may be generated based upon, at least in part, the tagging of the one or more portions of the input text. The discussion model may be presented.

One or more of the following example features may be included. Tagging the one or more portions of the input text may include tagging the one or more portions of the input text with one or more sentiment metrics based upon, at least in part, performing sentiment analysis on the one or more portions of the input text. Generating the discussion model may include adding one or more pre-defined phrases to the one or more portions of the input text based upon, at least in part, the one or more sentiment metrics. One or more pre-defined phrases may be added to the one or more portions of the input text to start the discussion model, interrupt the discussion model, and/or end the discussion model. The one or more pre-defined phrases may include one or more of accordant, discordant, and neutral phrases. Generating the discussion model between the plurality of virtual speakers may include allocating the one or more portions of the input text between the plurality of virtual speakers. The computer-implemented method may further include receiving user participation while presenting the discussion model.

In another example implementation, a computer program product resides on a non-transitory computer readable medium that has a plurality of instructions stored on it. When executed across one or more processors, the plurality of instructions cause at least a portion of the one or more processors to perform operations that may include but are not limited to receiving an input text. The one or more portions of the input text may be tagged. A discussion model between a plurality of virtual speakers may be generated based upon, at least in part, the tagging of the one or more portions of the input text. The discussion model may be presented.

One or more of the following example features may be included. Tagging the one or more portions of the input text may include tagging the one or more portions of the input text with one or more sentiment metrics based upon, at least in part, performing sentiment analysis on the one or more portions of the input text. Generating the discussion model may include adding one or more pre-defined phrases to the one or more portions of the input text based upon, at least in part, the one or more sentiment metrics. One or more pre-defined phrases may be added to the one or more portions of the input text to start the discussion model, interrupt the discussion model, and/or end the discussion model. The one or more pre-defined phrases may include one or more of accordant, discordant, and neutral phrases. Generating the discussion model between the plurality of virtual speakers may include allocating the one or more portions of the input text between the plurality of virtual speakers. Instructions may further be included for receiving user participation while presenting the discussion model.

In another example implementation, a computing system may include one or more processors and one or more memories, wherein the computing system is configured to perform operations that may include but are not limited to receiving an input text. The one or more portions of the input text may be tagged. A discussion model between a plurality of virtual speakers may be generated based upon, at least in part, the tagging of the one or more portions of the input text. The discussion model may be presented.

One or more of the following example features may be included. Tagging the one or more portions of the input text may include tagging the one or more portions of the input text with one or more sentiment metrics based upon, at least in part, performing sentiment analysis on the one or more portions of the input text. Generating the discussion model may include adding one or more pre-defined phrases to the one or more portions of the input text based upon, at least in part, the one or more sentiment metrics. One or more pre-defined phrases may be added to the one or more portions of the input text to start the discussion model, interrupt the discussion model, and/or end the discussion model. The one or more pre-defined phrases may include one or more of accordant, discordant, and neutral phrases. Generating the discussion model between the plurality of virtual speakers may include allocating the one or more portions of the input text between the plurality of virtual speakers. Operations of the computing system may include receiving user participation while presenting the discussion model.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE SEVERAL VIEWS OF THE DRAWINGS

FIG. 3 is an example input text received by the discussion model generation process of FIG. 1 according to one or more example implementations of the disclosure;

FIGS. 4-6 are example diagrammatic views of the generation of the discussion model from the input text according to one or more example implementations of the disclosure;

Like reference symbols in the various drawings indicate like elements.

DETAILED DESCRIPTION

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
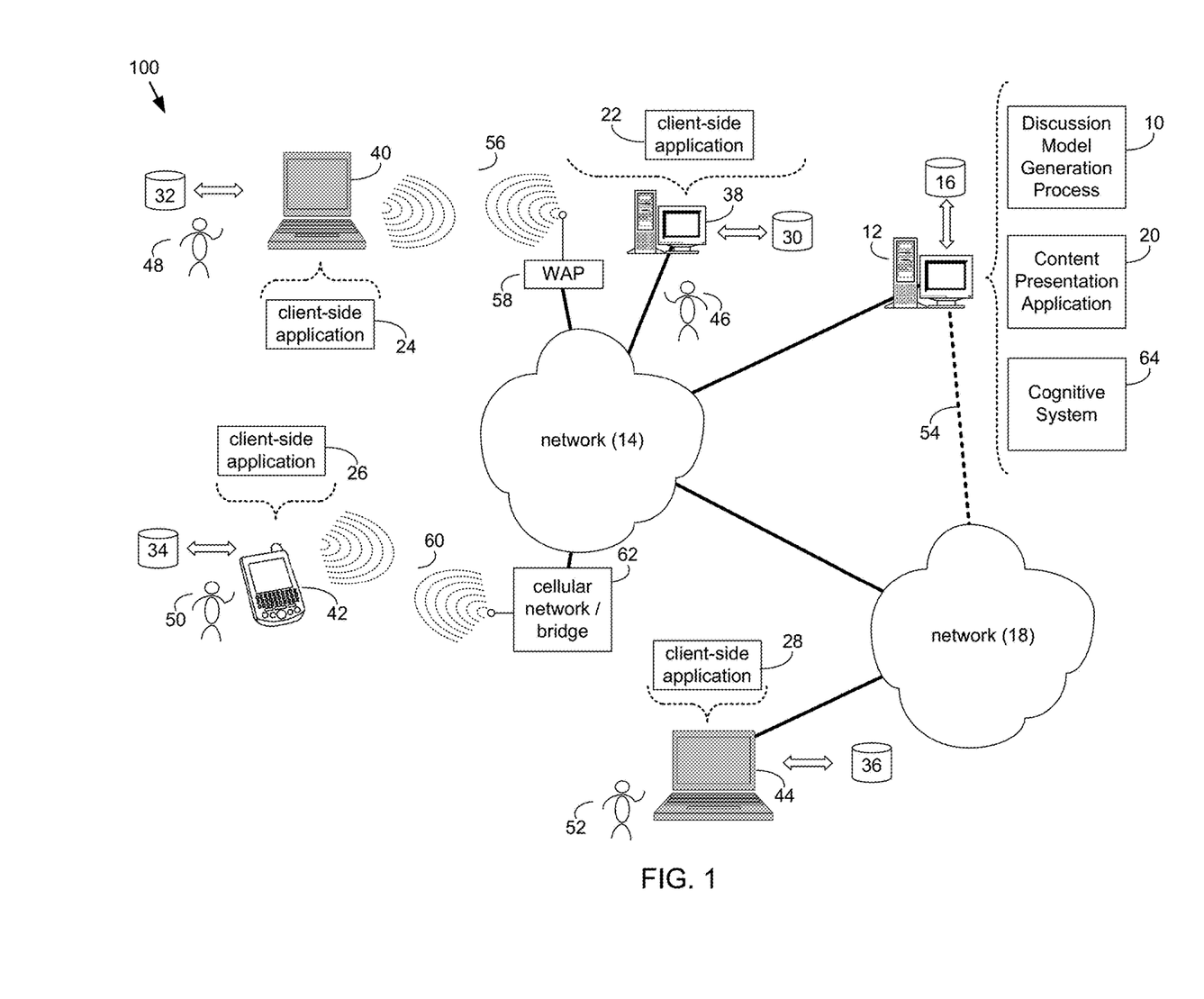
FIG. 1 is an example diagrammatic view of discussion model generation process coupled to a distributed computing network according to one or more example implementations of the disclosure.
Figure 2:
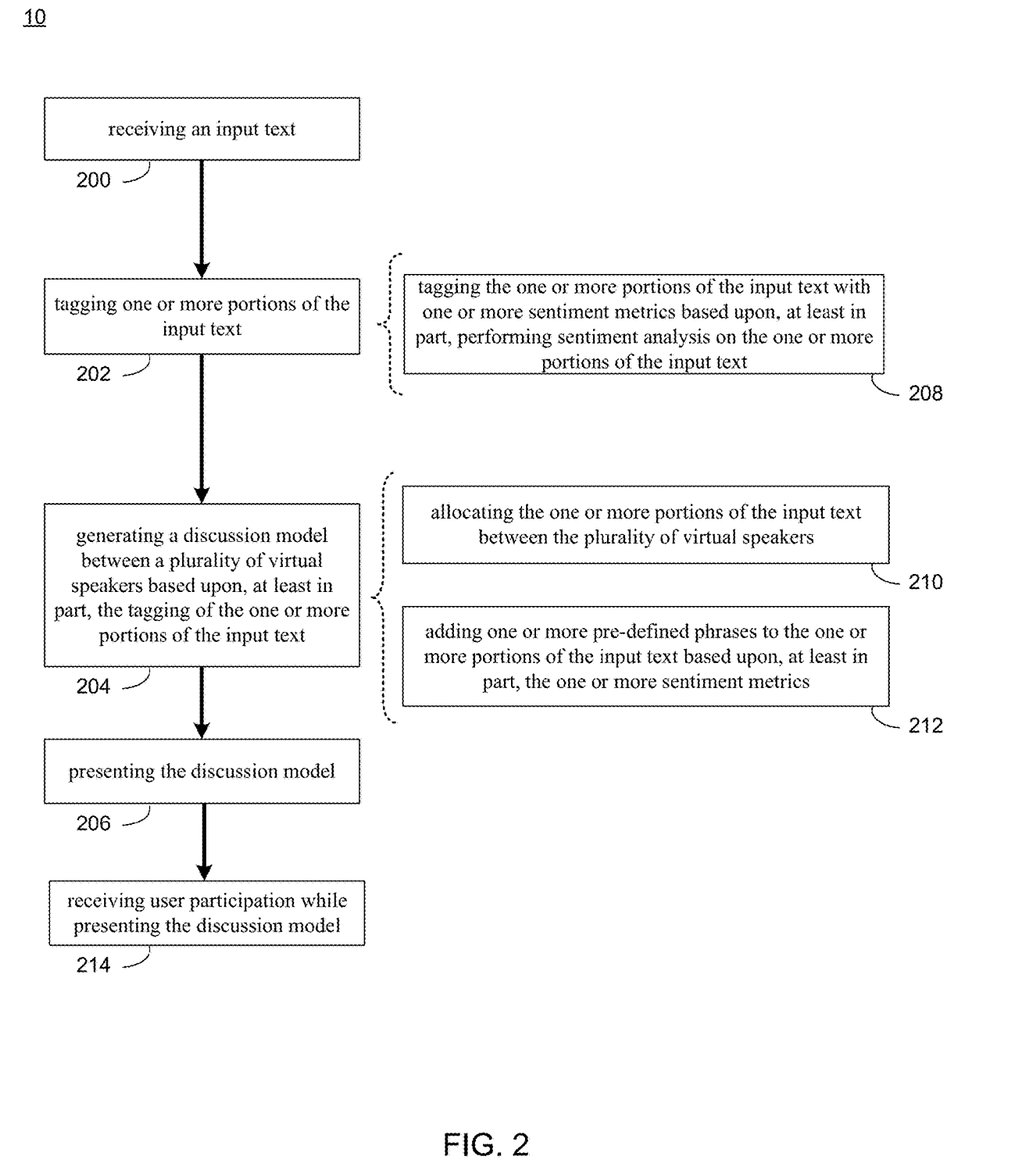
FIG. 2 is an example flowchart of the discussion model generation process of FIG. 1 according to one or more example implementations of the disclosure.

Referring now to FIG. 1, there is shown discussion model generation process 10 that may reside on and may be executed by a computing device 12, which may be connected to a network (e.g., network 14) (e.g., the internet or a local area network). Examples of computing device 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computing device 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, a discussion model generation process, such as discussion model generation process 10 of FIG. 1, may receive an input text. The one or more portions of the input text may be tagged. A discussion model between a plurality of virtual speakers may be generated based upon, at least in part, the tagging of the one or more portions of the input text. The discussion model may be presented.

The instruction sets and subroutines of discussion model generation process 10, which may be stored on storage device 16 coupled to computing device 12, may be executed by one or more processors (not shown) and one or more memory architectures (not shown) included within computing device 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Discussion model generation process 10 may be a stand-alone application that interfaces with an applet/application that is accessed via client applications 22, 24, 26, 28. In some embodiments, discussion model generation process 10 may be, in whole or in part, distributed in a cloud computing topology. In this way, computing device 12 and storage device 16 may refer to multiple devices, which may also be distributed throughout network 14 and/or network 18.

Computing device 12 may execute a content presentation application (e.g., content presentation application 20), examples of which may include, but are not limited to, applications that provide content (e.g., text, articles, presentations, etc.) to a user. For example, content presentation applications may include web applications, educational applications, digital libraries, word processing applications, etc. Discussion model generation process 10 and/or content presentation application 20 may be accessed via client applications 22, 24, 26, 28. Discussion model generation process 10 may be a stand-alone application, or may be an applet/application/script/extension that may interact with and/or be executed within content presentation application 20, a component of content presentation application 20, and/or one or more of client applications 22, 24, 26, 28. Content presentation application 20 may be a stand-alone application, or may be an applet/application/script/extension that may interact with and/or be executed within discussion model generation process 10, a component of discussion model generation process 10, and/or one or more of client applications 22, 24, 26, 28. One or more of client applications 22, 24, 26, 28 may be a stand-alone application, or may be an applet/application/script/extension that may interact with and/or be executed within and/or be a component of discussion model generation process 10 and/or content presentation application 20. Examples of client applications 22, 24, 26, 28, 66 may include, but are not limited to, applications that receive queries to search for content from one or more databases, servers, cloud storage servers, etc., a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, 802 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computing device 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Microsoft® Windows®; Mac® OS X®; Red Hat® Linux®, Windows® Mobile, Chrome OS, Blackberry OS, Fire OS, or a custom operating system.

One or more of client applications 22, 24, 26, 28, 66 may be configured to effectuate some or all of the functionality of discussion model generation process 10 (and vice versa). Accordingly, discussion model generation process 10 may be a purely server-side application, a purely client-side application, or a hybrid server-side/client-side application that is cooperatively executed by one or more of client applications 22, 24, 26, 28, 66 and/or discussion model generation process 10.

One or more of client applications 22, 24, 26, 28, may be configured to effectuate some or all of the functionality of content presentation application 20 (and vice versa). Accordingly, content presentation application 20 may be a purely server-side application, a purely client-side application, or a hybrid server-side/client-side application that is cooperatively executed by one or more of client applications 22, 24, 26, 28 and/or content presentation application 20. As one or more of client applications 22, 24, 26, 28, discussion model generation process 10, and content presentation application 20, taken singly or in any combination, may effectuate some or all of the same functionality, any description of effectuating such functionality via one or more of client applications 22, 24, 26, 28, discussion model generation process 10, content presentation application 20, or combination thereof, and any described interaction(s) between one or more of client applications 22, 24, 26, 28, discussion model generation process 10, content presentation application 20, or combination thereof to effectuate such functionality, should be taken as an example only and not to limit the scope of the disclosure.

Users 46, 48, 50, 52 may access computing device 12 and discussion model generation process 10 (e.g., using one or more of client electronic devices 38, 40, 42, 44) directly or indirectly through network 14 or through secondary network 18. Further, computing device 12 may be connected to network 14 through secondary network 18, as illustrated with phantom link line 54. Discussion model generation process 10 may include one or more user interfaces, such as browsers and textual or graphical user interfaces, through which users 46, 48, 50, 52 may access discussion model generation process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 800.11a, 800.11b, 800.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 800.11x specifications may use Ethernet protocol and carrier sense multiple access with collision avoidance (i.e., CSMA/CA) for path sharing. The various 800.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

As discussed above and referring also at least to FIGS. 2-8, discussion model generation process 10 may receive 200 an input text. The one or more portions of the input text may be tagged 202 with one or more sentiment metrics. A discussion model between a plurality of virtual speakers may be generated 204 based upon, at least in part, the tagging of the one or more portions of the input text. The discussion model may be presented 206.

In an example embodiment, the present disclosure may generally provide a system that may have the capability of converting a plain reading document or text into a discussion model. The example discussion model may provide two or more (virtual) persons who may discuss and/or otherwise talk about the document or text. In some implementations, the system may allow an end user (e.g., a user watching and/or listening to the discussion or the document or text) to be involved in the discussion, e.g., by allowing the user to ask questions and/or agree or disagree with views presented in the discussion.

As generally discussed above with reference to FIG. 2, discussion model generation process 10 may receive 200 in input text. In some implementations, the input text may include any text provided to discussion model generation process 10 such as, one or more words, one or more sentences, one or more paragraphs, one or more pages of content, one or more articles, one or more books, one or more webpages, etc. It will be appreciated that other examples of input text may be received. In some implementations, discussion model generation process 10 may receive the input text via a text entry system, in an application or plugin associated with a browser or webpage, from a word processor, from a selection of an input text from a library or database of input texts, via an automated speech recognition (ASR) system, etc. As will be described in greater detail below and in some implementations, the input text may include one or more topics and or sub-topics.

In some implementations and referring also to FIG. 3, discussion model generation process 10 may receive input text 300. Input text 300 may represent an example input text received by discussion model generation process 10. In the example implementation of FIG. 3, input text 300 may generally describe the arguments for and against grading students in academic environments. However, it will be appreciated that other input texts regarding other topics may be received within the scope of the present disclosure.

In some implementations, discussion model generation process 10 may tag 202 one or more portions of the input text. In an example embodiment, the input text (e.g., which may be used to build the discussion model) may be tagged 202 in such a way that may define how the content of the input text may be shared among the (virtual) speakers. In some implementations, portions of the input text may include one or more words, one or more sentences, one or more paragraphs, one or more pages, and/or one or more sections of an input text. In some implementations, discussion model generation process 10 may analyze the one or more portions of the input text and tag the one or more portions with one or more tags. As will be discussed in greater detail below, the one or more portions of the input text may be tagged with one or more tags such as sentiment metrics and/or one or more topics.

In some implementations, tagging 202 the one or more portions of the input text may include tagging 208 the one or more portions of the input text with one or more sentiment metrics. In an embodiment, the sentiment metric may assist discussion model generation process 10 in determining a proper context for various tagged portions of the input text. A sentiment metric or sentiment factor may generally include an emotional state, sentiment, or tone of text, voice, or other input. In some implementations, "positive", "negative", and "neutral" may be examples of sentiment metrics. In some implementations, sentiment metrics may include "angry", "sad", and "happy" emotional states. It will be appreciated that other sentiment metrics are possible and within the scope of the present disclosure.

In some implementations, tagging 208 the one or more portions of the input text with the one or more sentiment metrics may include performing sentiment analysis on the one or more portions of the input text. Sentiment analysis may generally include the use of computational natural language processing, text analysis, computational linguistics, and/or biometrics to systematically identify, extract, quantify, and study affective states and subjective information. In some implementations, discussion model generation process 10 may perform sentiment analysis on the one or more portions of the input text to define the one or more sentiment metrics using a cognitive system (e.g., cognitive system 64). Cognitive system 64 may generally include any software, hardware, or combination of software and hardware configured to analyze text and determine sentiment and/or a topic or context of text. An example of cognitive system 64 may include Watson® and/or Watson Analytics® from IBM® (IBM, Watson, and Watson Analytics are registered trademarks of International Business Machines Corporation in the United States, other countries or both). However, it will be appreciated that other cognitive systems are possible within the scope of the present disclosure.

In some implementations, discussion model generation process 10 may perform sentiment analysis on one or more portions of the input text and determine that the one or more portions include a sentiment metric of "positive", "negative", and/or "neutral". However, it will be appreciated that performing sentiment analysis on the one or more portions of text may include determining other sentiment metrics for the portions of text. In response to performing sentiment analysis and determining the one or more sentiment metrics associated with the one or more portions of the input text, discussion model generation process 10 may tag 202 the one or more portions of the input text with the one or more sentiment metrics.

For example, discussion model generation process 10 may perform sentiment analysis on one or more words in the one or more portions of the input text to define the one or more sentiment metrics associated with the one or more portions. In some implementations, discussion model generation process 10 may perform sentiment analysis on each sentence (e.g., by performing sentiment analysis on one or more words of each sentence) to determine one or more sentiment metrics associated with each sentence. In response to defining the one or more sentiment metrics associated with each sentence, discussion model generation process 10 may tag 202 each sentence with the one or more sentiment metrics. It will be appreciated that other variations in the "size" of the one or more portions (e.g., a plurality of sentences, each paragraph, a plurality of paragraphs, each section, etc.) of the input text may be analyzed and tagged with one or more sentiment metrics. For example, discussion model generation process 10 may perform sentiment analysis on each paragraph (e.g., by performing sentiment analysis on one or more words of one or more sentences in each paragraph) to determine one or more sentiment metrics associated with each paragraph.

Referring also to the example of FIG. 4, discussion model generation process 10 may perform sentiment analysis on one or more portions (e.g., portions 402, 404, 406, 408, 410, 412, 414). Examples of resulting sentiment metrics or tones associated with the one or more portions of the input text are shown in parenthesis (e.g., "(Positive Sentence)") in portions 402, 404, 406, 408, 410, 412, 414. It will be appreciated that other sentiment metrics may be defined based upon, at least in part, sentiment analysis of the one or more portions of the input text.

In some implementations, tagging 202 the one or more portions of the input text may include tagging the one or more portions of the input text with one or more topics based upon, at least in part, determining the one or more topics associated with the one or more portions of the input text. In some implementations, discussion model generation process 10 may analyze the one or more portions of input text to determine one or more topics associated with the one or more portions of the input text. For example, discussion model generation process 10 may analyze one or more words in the one or more portions of the input text to determine one or more topics associated with the one or more portions. In some implementations, discussion model generation process 10 may analyze each sentence (e.g., by analyzing one or more words of each sentence) to determine one or more topics associated with each sentence. In response to determining the one or more topics associated with each sentence, discussion model generation process 10 may tag 202 each sentence with the one or more topics. It will be appreciated that other variations in the "size" of the one or more portions (e.g., a plurality of sentences, each paragraph, a plurality of paragraphs, each section, etc.) of the input text may be analyzed and tagged with one or more topics. For example, discussion model generation process 10 may analyze each paragraph (e.g., by analyzing one or more words of one or more sentences in each paragraph) to determine one or more topics associated with each paragraph.

In some implementations, discussion model generation process 10 may generate 204 a discussion model between a plurality of virtual speakers based upon, at least in part, the tagging of the one or more portions of the input text. A discussion model may generally refer to a dialogue or conversation generated by discussion model generation process 10 from the one or more portions of input text allocated to a plurality of speakers. A virtual speaker may generally refer to an audio and/or video representation of a speaker or presenter of one or more portions of the input text in the form of the discussion model. As will be discussed in greater detail below, the virtual speakers may include distinct voices (e.g., via a text-to-speech system) and/or may be represented by animated characters displayed on a user-interface with embedded audio and/or in other output forms. However, it will be appreciated that the discussion model generated 204 by discussion model generation process 10 may be provided to non-virtual speakers (e.g., humans) who may recite the one or more portions of the input text based upon, at least in part, the tagging of the one or more portions of the input text.

In some implementations, the plurality of virtual speakers may include any number of speakers. In some implementations, discussion model generation process 10 may automatically determine the number of virtual speakers for an input text. For example, discussion model generation process 10 may identify a number of viewpoints or perspectives within the input text, and may determine the number of virtual speakers based upon, at least in part, the identified number of viewpoints or perspectives. In some implementations, the number of virtual speakers may be user-defined (e.g., via a user interface) and/or may be defined by a default number of virtual speakers (e.g., at least two virtual speakers). In some implementations and in response to tagging the one or more portions of the input text, discussion model generation process 10 may generate the discussion model including the one or more portions of input text that may be allocated to the plurality of virtual speakers.

In some implementations, generating 204 the discussion model between the plurality of virtual speakers may include allocating 210 the one or more portions of the input text between the plurality of virtual speakers. In some implementations, discussion model generation process 10 may allocate 210 an equal number of portions to each of the plurality of speakers. For example, discussion model generation process 10 may determine a number of portions of the input text (e.g., paragraphs) and determine a number of virtual speakers (e.g., two) and may allocate 210 the number of portions (e.g., number of paragraphs) equally between the plurality of virtual speakers. In some implementations, each virtual speaker may be allocated at least one portion of the input text. As will be discussed in greater detail below and in some implementations, discussion model generation process 10 may allocate 210 the portions of the input text based upon, for example, viewpoints, positions, and/or topics expressed in the input text, e.g., which may result in an unequal allocation amongst the virtual speakers. In some implementations, the number of portions to be allocated may be user-defined (e.g., by a user interface) or may be a default number of portions to be allocated.

In some implementations, the one or more portions may be allocated 210 based upon, at least in part, the topic or subject of the one or more portions. For example, discussion model generation process 10 may determine which portions of the input text and how many portions of the input text are tagged with a particular topic. In some implementations, discussion model generation process 10 may filter one or more portions of the input text from the discussion model that are not related to the particular topic (e.g., based upon at least in part a relevancy threshold). Discussion model generation process 10 may determine a number of virtual speakers (e.g., two) and may allocate 210 the number of portions between the plurality of virtual speakers based upon, at least in part, the particular topic or subject of the one or more portions.

In some implementations, the one or more portions may be allocated 210 based upon, at least in part, the one or more sentiment metrics associated with the one or more portions. For example, discussion model generation process 10 may determine which portions of the input text are tagged with a particular sentiment metric. For example, discussion model generation process 10 may determine one or more portions of the input text that tagged as "positive" and one or more portions that are tagged as "negative". Discussion model generation process 10 may determine a number of virtual speakers (e.g., two) and may allocate 210 the portions of input text tagged as "positive" to a first speaker and the portions of the input text tagged as "negative" to a second speaker. For example, these sentiment metrics may represent a positive view and a negative view which may be allocated to the plurality of virtual speakers.

In some implementations, the one or more portions may be allocated 210 based upon, at least in part, the one or more sentiment metrics associated with the one or more portions in combination with the topic or subject of the one or more portions. For example, these sentiment metrics in combination with a particular topic may represent a positive view and a negative view of a particular topic which may be allocated to the plurality of virtual speakers.

Referring to the example of FIG. 5, discussion model generation process 10 may generate 204 the discussion model from input text 300 by allocating 210 the one or more portions of the input text between a plurality of virtual speakers (e.g., Speaker 1 and Speaker 2). For example, discussion model generation process 10 may allocate 210 one or more portions (e.g., portions 504, 508, 512) to a first virtual speaker (e.g., Speaker 1), one or more portions (e.g., portions 506, 510, 514) to a second virtual speaker (e.g., Speaker 2), and/or one or more portions (e.g., 502) to a narrator. For example and as discussed above, the one or more portions may be tagged 202 in such a way that the content may be shared among the virtual speakers. In some implementations, discussion model generation process 10 may allocate 210 at least one portion (e.g., portion 502) as an introduction for a narrator to present. This may provide background to set the context of the discussion model. However, it will be appreciated that allocating a portion of the input text to a narrator is optional. In the example input text of FIGS. 4-5, discussion model generation process 10 may tag 202 one or more portions (e.g., each sentence) with a sentiment metric or factor. As shown in FIG. 4, the sentence (e.g., "Grading gives students a clear cut idea of their weaknesses and strengths") may be tagged with a positive sentiment metric (e.g., based upon, at least in part, sentiment analysis). In some implementations, discussion model generation process 10 may allocate this sentence to a first virtual speaker (e.g., Speaker 1) by tagging the sentence with "Speaker 1". Discussion model generation process 10 may perform sentiment analysis on the next sentence (e.g., "Knowing precisely which subject(s) are their weak spots, students can easily decide where to toggle their focal point on") and tag this sentence with a sentiment metric (e.g., positive). In some implementations, if the next sentence (e.g., "Knowing precisely which subject(s) are their weak spots, students can easily decide where to toggle their focal point on") is also positive, then the next sentence may also be allocated to Speaker 1 by tagging the second sentence with Speaker 1. The sentences allocated 210 by discussion model generation process 10 are shown as portion 504 in FIG. 5.

In some implementations, discussion model generation process 10 repeats until it finds a sentence (e.g., "It is assumed and stated in the philosophy of the current educational system that grading encourages learning and without it students would not study") with a different sentiment. In some implementations and in response to tagging 202 a sentence with a different sentiment metric (e.g., a negative sentiment metric), discussion model generation process 10 may allocate the next set of sentences with the same sentiment metric (e.g., portion 506) to a second virtual speaker (e.g., Speaker 2) until another sentence is tagged with a different sentiment metric (e.g., a positive sentiment metric). In this way, discussion model generation process 10 may allocate the one or more portions of the input text based upon, at least in part, the one or more sentiment metrics associated with the one or more portions.

Referring again to the example of FIG. 4 and in some implementations, discussion model generation process 10 may tag 202 a first set of portions (e.g., portions 404, 408, 410, 412) with a first sentiment metric (e.g., positive sentiment) and a second set of portions (e.g., portions 406) with a second sentiment metric (e.g., negative sentiment). In this example, allocating 210 the one or more portions of the input text based upon, at least in part, the one or more sentiment metrics associated with the one or more portions may result in a first virtual speaker presenting portions 404, 408, 410, 412 and a second virtual speaker presenting portion 406. In some implementations, discussion model generation process 10 may determine that there is a generally unequal allocation of the one or more portions to the plurality of virtual speakers.

In some implementations, discussion model generation process 10 may allocate 210 the one or more portions based upon, at least in part, the one or more sentiment metrics associated with the one or more portions and a maximum number of portions for each virtual speaker. For example and as discussed above, if the input text includes more portions tagged 202 with a first sentiment metric (e.g., negative sentiment) than portions tagged 202 with a second sentiment metric (e.g., positive sentiment), discussion model generation process 10 may allocate 210 a maximum number of portions (e.g., two, four, six sentences, etc.) to each virtual speaker. For example and as shown in FIG. 5, discussion model generation process 10 may allocate the sentences of portion 504 and 506 to Speaker 1 and Speaker 2, respectively based upon at least in part, the sentiment metric associated with portions 504 and 506 and a maximum number of sentences (e.g., four sentences) for each sentiment metric. In some implementations, discussion model generation process 10 may tag portion 408 with a positive sentiment metric which may be a different sentiment metric than that of portion 406. In this example, discussion model generation process 10 may allocate 210 the sentences of portion 508 to the first virtual speaker (e.g., Speaker 1).

In some implementations, discussion model generation process 10 may tag portion 410 with a positive sentiment metric which may be the same sentiment metric as portion 408. In this example, discussion model generation process 10 may allocate 210 the sentences of portion 510 to the second virtual speaker (e.g., Speaker 2) because the first virtual speaker (e.g., Speaker 1) may be allocated the maximum number of sentences for the positive sentiment metric (e.g., portion 508 includes the maximum number of sentences for each sentiment metric). In this example, the maximum number of sentences may be four. However, it will be appreciated that other maximum numbers of portions are possible and within the scope of the present disclosure. In some implementations, the maximum number of portions for each sentiment metric may be different for each virtual speaker. For example, a first virtual speaker may have a maximum of four portions allocated for each sentiment metric while a second virtual speaker may have a maximum of six portions allocated for each sentiment metric.

Discussion model generation process 10 may continue to allocate 210 the one or more portions until each of the one or more portions are allocated to the plurality of virtual speakers. For example and as described above, discussion model generation process 10 may allocate portion 510 to Speaker 2 and portion 512 to Speaker 1 based upon, at least in part, the sentiment metric associated with portions 504 and 506 and a maximum number of sentences for each sentiment metric. In some implementations, discussion model generation process 10 may allocate 210 portion 514 to Speaker 2 based upon, at least in part, the sentiment metric associated with portion 514 (e.g., neutral sentiment).

In some implementations, generating the discussion model may include adding 212 one or more pre-defined phrases to the one or more portions of the input text based upon, at least in part, the one or more sentiment metrics. Pre-defined phrases may generally include transitional phrases that may be added 212 to one or more portions of the discussion model/portions of the input text. In some implementations, the pre-defined phrases may be stored in a database or data store (e.g., storage device 16) in communication with discussion model generation process 10. In some implementations, the pre-defined phrases may be added to the database or data store by a user or may include a default listing of pre-defined phrases. In some implementations, discussion model generation process 10 may receive and/or remove pre-defined phrases via a user-interface and/or other content presentation application (e.g., content presentation application 20).

In some implementations, the one or more pre-defined phrases may include one or more of accordant, discordant, and neutral phrases. Examples of accordant phrases may include, but are not limited to, "In addition"; "Moreover"; "Furthermore"; "I entirely/quite agree with you"; "I am of the same opinion"; "I agree"; "Yes, you are right"; etc. It will be appreciated that accordant phrases may generally include phrases that demonstrates an accord or agreement and that other accordant phrases may be used within the scope of the present disclosure. Examples of discordant phrases may include, but are not limited to, "As far as I am concerned"; "As for me"; "As I take it"; "As far as I can see"; "I disagree with you"; "I am sure you're mistaken"; "Let's agree to disagree"; "However"; "But"; etc. It will be appreciated that discordant phrases may generally include phrases that demonstrates a discord or disagreement and that other discordant phrases may be used within the scope of the present disclosure. Examples of neutral phrases may include, but are not limited to, "In other words"; "In this respect"; "To a certain degree/extent"; "It depends on your point of view"; "In brief"; "To be brief"; "To cut a long story short"; "Let me put it this way", "In summary"; "Personally, I think"; etc. It will be appreciated that neutral phrases may generally include phrases that demonstrate neither agreement or disagreement and that other discordant phrases may be used within the scope of the present disclosure. In some implementations, the one or more pre-defined phrases may be categorized in a database or data store (e.g., storage device 16) as "accordant", "discordant", or "neutral".

In some implementations, adding 212 the one or more pre-defined phrases to the one or more portions of the input text may include comparing the sentiment metrics of adjacent portions of the input text. For example, if a first portion of the input text allocated 210 to a first speaker is tagged with a "positive" sentiment metric (e.g., by sentiment analysis) and if the sentiment of an adjacent second portion allocated 210 to a second speaker is also tagged with a "positive" sentiment metric, then discussion model generation process 10 may add 212 an accordant phrase to the second portion. In some implementations, if the first portion of the input text allocated 210 to a first speaker is tagged with a "positive" sentiment metric (e.g., by sentiment analysis) and if the sentiment of an adjacent second portion allocated 210 to a second speaker is tagged with a "negative" sentiment metric, then discussion model generation process 10 may add 212 a discordant phrase to the second portion.

Referring also to the example of FIG. 6, discussion model generation process 10 may add 212 one or more pre-defined phrases to the one or more portions of the input text (e.g., portions 602, 604, 606, 608, 610, 612, 614) based upon, at least in part, the sentiment metrics. For example, portion 602 may tagged with a "positive" sentiment metric (e.g., by sentiment analysis) and adjacent portion 604 may be tagged with a "negative" sentiment metric. In this example, discussion model generation process 10 may add 212 a discordant phrase (e.g., "I am sure you're mistaken") to portion 604. The pre-defined phrases added to the one or more portions are shown in FIG. 6 in bold text. In this way, the addition of pre-defined phrases to the one or more portions of the input text based upon, at least in part, the sentiment metrics may make the discussion more lively and engaging.

In some implementations, the one or more pre-defined phrases may be added 212 to the one or more portions of the input text to at least one of start the discussion model, interrupt the discussion model, and end the discussion model. Referring also to the example of FIG. 6, discussion model generation process 10 may add the pre-defined phrase "Personally I think" to portion 604 to start the discussion model. In some implementations, discussion model generation process 10 may add one or more pre-defined phrases to one or more portions of the input text to interrupt the discussion model. For example, discussion model generation process 10 may add one or more pre-defined phrases to interrupt the discussion model to provide a summary of the input text, a background of the input text, etc. In some implementations, discussion model generation process 10 may add one or more pre-defined phrases to one or more portions of the input text to end the discussion model. For example, discussion model generation process 10 may add the pre-defined phrase "To cut a long story short" to portion 614 to end the discussion model.

In some implementations, discussion model generation process 10 may present 206 the discussion model. Referring also to the examples of FIGS. 6 and 7, discussion model generation process 10 may generate a discussion model (e.g., discussion model 600) that may be presented. In some implementations, discussion model generation process 10 may include a text-to-speech (TTS) system configured to generate an audio or speech representation of the one or more portions of the discussion model. In some implementations, the discussion model may include an embedded audio representation of one or more portions of the discussion model with distinct "voices" or speech representations to represent the plurality of virtual speakers in the discussion model. In some implementations, the same "voice" or speech representation may be used to represent the plurality of virtual speakers and/or a different tone or inflection may be used to represent individual speakers of the plurality of virtual speakers.

In some implementations, discussion model generation process 10 may present 206 the discussion model as an animation with voice over of a discussion. Referring also to the example of FIG. 7, discussion model generation process 10 may present 206 the plurality of virtual speakers via animated characters on a user interface (e.g., discussion model presentation window 702). For example, discussion model generation process 10 may represent a first virtual speaker (e.g., Speaker 1 of discussion model 600) with animated character 702 and a second virtual speaker (e.g., Speaker 2 of discussion model 600) with animated character 704. In some implementations, discussion model generation process 10 may provide an audio voice over for each virtual speaker via a TTS system. In some implementations, discussion model generation process 10 may display the one or more portions of the discussion model in a user interface (e.g., comment bubble 706 in discussion model presentation window 702). In some implementations, discussion model generation process 10 may export the discussion model for presentation via a separate application (e.g., content presentation application 20).

Figure 7:
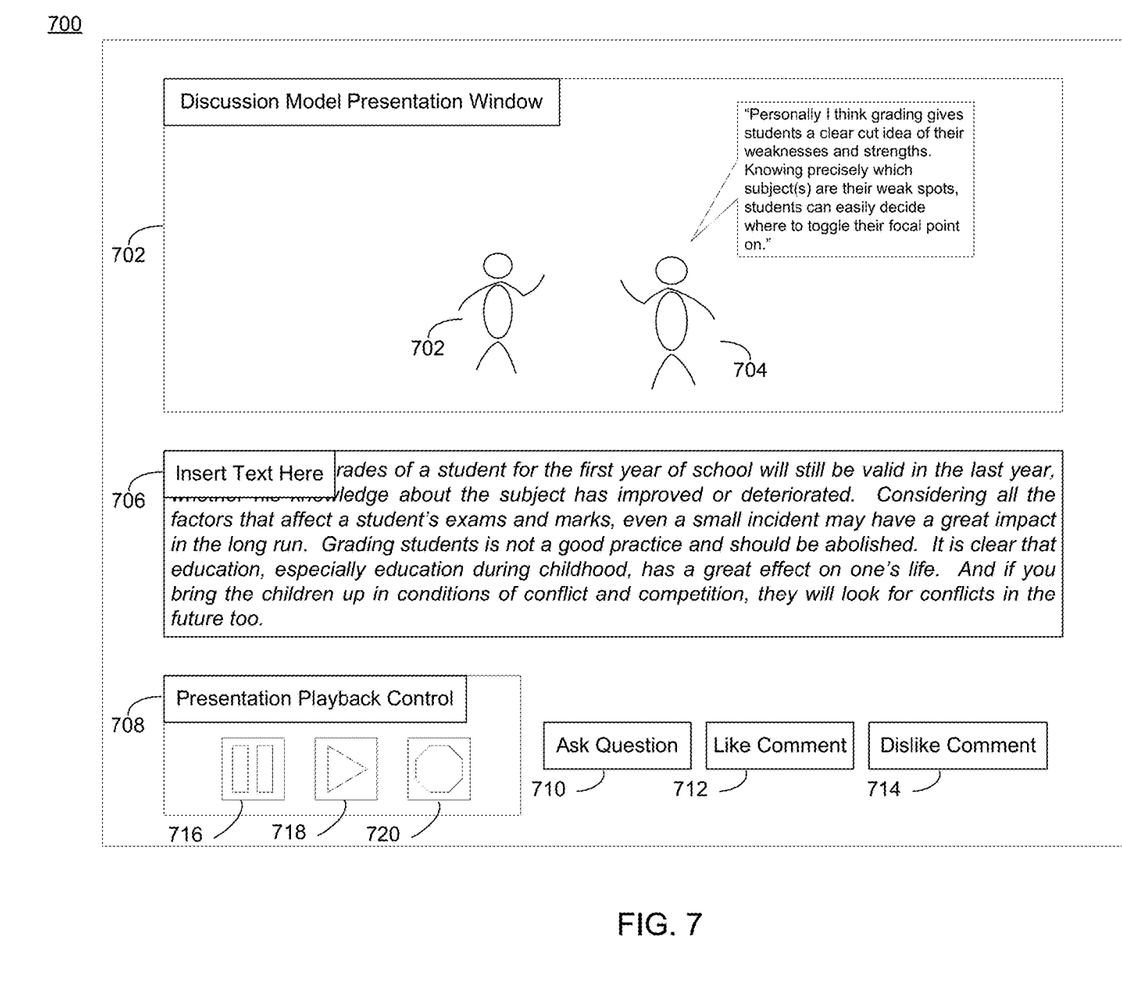
FIG. 7 is an example diagrammatic view of a user interface for presenting a discussion model generated according to one or more example implementations of the disclosure.

In some implementations and as shown in the example of FIG. 7, discussion model generation process 10 may generate and render a user interface (e.g., user interface 700) with a discussion model presentation window or portion (e.g., discussion model presentation window 702), an input text box (e.g., text box 706), presentation playback controls (e.g., presentation playback controls 708), and/or user participation controls (e.g., buttons 710, 712, 714). In some implementations, discussion model generation process 10 may receive 200 the input text via an input text box (e.g., text box 706). As discussed above, discussion model generation process 10 may tag 202 one or more portions of the input text and generate 204 a discussion model based upon, at least in part, the tagging of the one or more portions of the input text. In some implementations and via presentation playback controls (e.g., presentation playback controls 708), a user may control the presentation of the discussion model (e.g., discussion model 600) in the discussion model presentation window or portion (e.g., discussion model presentation window 702). Presentation playback controls 708 may include a pause feature 716, a play feature 718, and a stop feature 720 configured to pause, play, and stop (respectively) the presentation of the discussion model. It will be appreciated that additional or fewer presentation playback controls may be used.

In some implementations, discussion model generation process 10 may receive 214 user participation while presenting the discussion model. In some implementations, a user may participate with discussion model generation process 10 may interacting with various portions of a user interface (e.g., user interface 700). In some implementations, a user may not understand a statement or comment made during the presentation of the discussion model and may ask a question. In some implementations, discussion model generation process 10 may provide various user participation controls (e.g., buttons 710, 712, 714). In some implementations, a user who has a question may select "Ask Question" button 710. In response to a selection of the "Ask Question" button, discussion model generation process 10 may render a pop-up window or other text box to receive 214 a question and/or may receive the question via a microphone. In some implementations, a user may ask their question into a microphone communicatively coupled to the user interface. In some implementations, the user's speech utterance may be received via the microphone and converted (e.g., via an automated speech recognition (ASR) module or software) into a text representation. In response to receiving the question (e.g., as a text entry into a text box and/or a text representation generated from a spoken utterance), the discussion model playback may automatically pause.

In some implementations, the question (e.g., as a text entry into a text box and/or a text representation generated from a spoken utterance) may be provided to a chat bot (e.g., of discussion model generation process 10 and/or content presentation application 20) to interact with the user. In response to receiving the question, discussion model generation process 10 (e.g., via the chat bot) may provide a detailed explanation of the statement to the user. In some implementations, the explanation of the statement may be provided as an audio response (e.g., via a TTS system) and or as a text response in a text box. In some implementations and as discussed above, discussion model generation process 10 may use a cognitive system (e.g., cognitive system 64) such as, for example, Watson® and/or Watson Analytics® from IBM®, to analyze a question, understand the intent, and provide an appropriate answer.

In some implementations, receiving 214 user participation while presenting the discussion model may include receiving a "like" and/or a "dislike" input from a user (e.g., via buttons 712, 714). In some implementations, discussion model generation process 10 may store the user's participation and/or feedback in a database.

Figure 8:
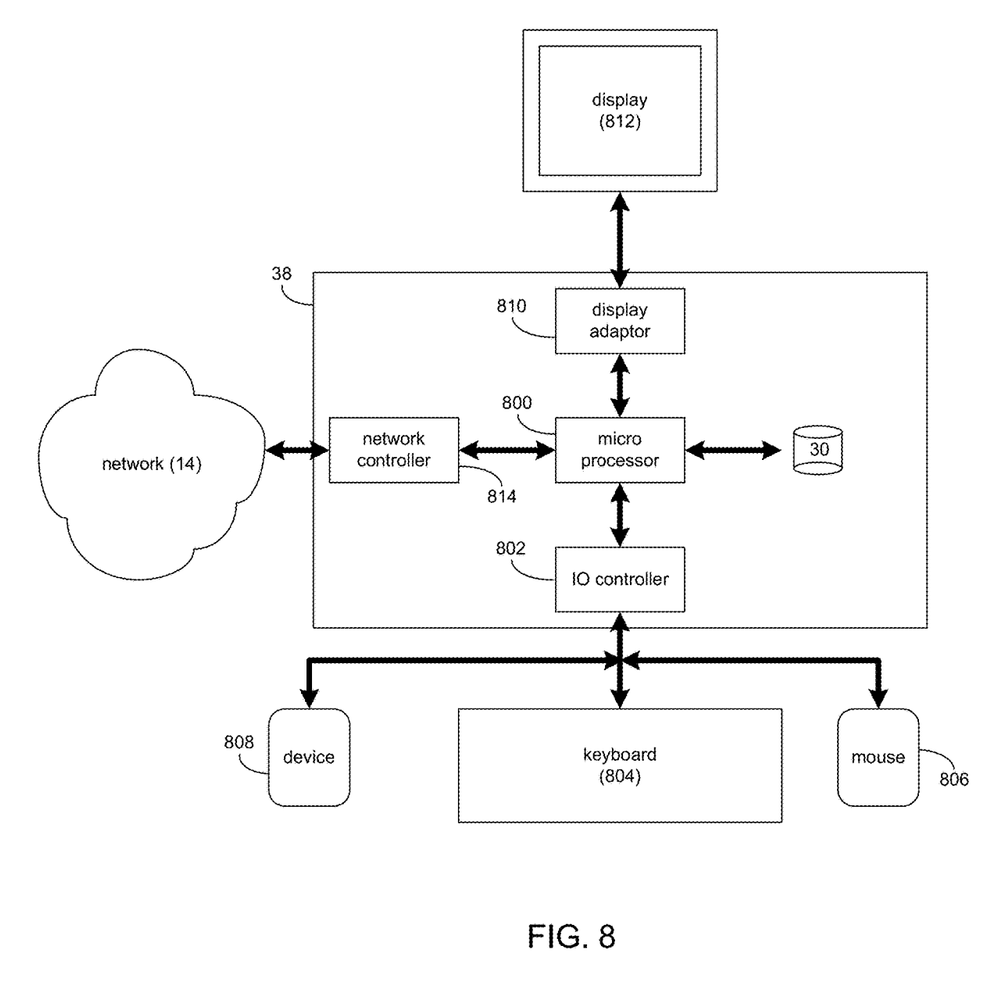
FIG. 8 is an example diagrammatic view of a client electronic device of FIG. 1 according to one or more example implementations of the disclosure.

Referring also to FIG. 8, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, discussion model generation process 10 may be substituted for client electronic device 38 within FIG. 8, examples of which may include but are not limited to computing device 12 and/or client electronic devices 40, 42, 44.

Client electronic device 38 may include a processor and/or microprocessor (e.g., microprocessor 800) configured to, e.g., process data and execute the above-noted code/instruction sets and subroutines. Microprocessor 800 may be coupled via a storage adaptor (not shown) to the above-noted storage device(s) (e.g., storage device 30). An I/O controller (e.g., I/O controller 802) may be configured to couple microprocessor 800 with various devices, such as keyboard 804, pointing/selecting device (e.g., mouse 806), custom device, such a microphone (e.g., device 808), USB ports (not shown), and printer ports (not shown). A display adaptor (e.g., display adaptor 810) may be configured to couple display 812 (e.g., CRT or LCD monitor(s)) with microprocessor 800, while network controller/adaptor 814

(e.g., an Ethernet adaptor) may be configured to couple microprocessor 800 to the above-noted network 14 (e.g., the Internet or a local area network).

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   receiving, at a computing device, an input text;
   tagging one or more portions of the input text, wherein tagging the one or more portions of the input text includes tagging the one or more portions of the input text with one or more sentiment metrics based upon, at least in part, performing sentiment analysis on the one or more portions of the input text;
   generating a discussion model between a plurality of virtual speakers based upon, at least in part, the tagging of the one or more portions of the input text; and
   presenting the discussion model.

2. The computer-implemented method of claim 1, further comprising:
   receiving user participation while presenting the discussion model.

3. The computer-implemented method of claim 1, wherein generating the discussion model includes adding one or more pre-defined phrases to the one or more portions of the input text based upon, at least in part, the one or more sentiment metrics.

4. The computer-implemented method of claim 3, wherein the one or more pre-defined phrases are added to the one or more portions of the input text to at least one of start the discussion model, interrupt the discussion model, and end the discussion model.

5. The computer-implemented method of claim 3, wherein the one or more pre-defined phrases include one or more of accordant, discordant, and neutral phrases.

6. The computer-implemented method of claim 1, wherein generating the discussion model between the plurality of virtual speakers includes allocating the one or more portions of the input text between the plurality of virtual speakers.

7. A computer program product comprising a non-transitory computer readable storage medium having a plurality of instructions stored thereon, which, when executed by a processor, cause the processor to perform operations comprising:
   receiving, at a computing device, an input text;
   tagging one or more portions of the input text, wherein tagging the one or more portions of the input text includes tagging the one or more portions of the input text with one or more sentiment metrics based upon, at least in part, performing sentiment analysis on the one or more portions of the input text;
   generating a discussion model between a plurality of virtual speakers based upon, at least in part, the tagging of the one or more portions of the input text; and
   presenting the discussion model.

8. The computer program product of claim 7, wherein generating the discussion model includes adding one or more pre-defined phrases to the one or more portions of the input text based upon, at least in part, the one or more sentiment metrics.

9. The computer program product of claim 8, wherein the one or more pre-defined phrases are added to the one or more portions of the input text to at least one of start the discussion model, interrupt the discussion model, and end the discussion model.

10. The computer program product of claim 8, wherein the one or more pre-defined phrases include one or more of accordant, discordant, and neutral phrases.

11. The computer program product of claim 7, wherein generating the discussion model between the plurality of virtual speakers includes allocating the one or more portions of the input text between the plurality of virtual speakers.

12. The computer program product of claim 8, further comprising:
    receiving user participation while presenting the discussion model.

13. A computing system including one or more processors and one or more memories configured to perform operations comprising:
    receiving, at a computing device, an input text;
    tagging one or more portions of the input text, wherein tagging the one or more portions of the input text includes tagging the one or more portions of the input text with one or more sentiment metrics based upon, at least in part, performing sentiment analysis on the one or more portions of the input text;
    generating a discussion model between a plurality of virtual speakers based upon, at least in part, the tagging of the one or more portions of the input text; and
    presenting the discussion model.

14. The computing system of claim 13, wherein generating the discussion model includes adding one or more pre-defined phrases to the one or more portions of the input text based upon, at least in part, the one or more sentiment metrics.

15. The computing system of claim 14, wherein the one or more pre-defined phrases are added to the one or more portions of the input text to at least one of start the discussion model, interrupt the discussion model, and end the discussion model.

16. The computing system of claim 13, wherein the one or more pre-defined phrases include one or more of accordant, discordant, and neutral phrases.

17. The computing system of claim 13, wherein generating the discussion model between the plurality of virtual speakers includes allocating the one or more portions of the input text between the plurality of virtual speakers.

* * * * *